(12) United States Patent
Granston et al.

(10) Patent No.: US 7,275,727 B2
(45) Date of Patent: Oct. 2, 2007

(54) HANGER FOR CHRISTMAS ORNAMENTS AND OTHER OBJECTS

(76) Inventors: Pamela Parker Granston, 15604 64th Ave. NE., Kenmore, WA (US) 98028; Diane Christine Dorow, 16425 266th Ave. SE., Issaquah, WA (US) 98027

( * ) Notice: Subject to any disclaimer, the term of this patent is extended or adjusted under 35 U.S.C. 154(b) by 72 days.

(21) Appl. No.: 11/229,962

(22) Filed: Sep. 19, 2005

(65) Prior Publication Data
US 2006/0278793 A1 Dec. 14, 2006

Related U.S. Application Data

(60) Provisional application No. 60/684,788, filed on May 26, 2005.

(51) Int. Cl.
*A43H 1/16* (2006.01)

(52) U.S. Cl. ............ 248/302; 24/598.2; 248/315

(58) Field of Classification Search ........ 248/339, 248/340, 303, 305, 315, 309, 302; 24/16 PB, 24/17 B, 27, 598.2, 601.3, 601.8, 601.9; 63/13, 3, 3.1, 11
See application file for complete search history.

(56) References Cited

U.S. PATENT DOCUMENTS

| | | | | |
|---|---|---|---|---|
| 1,974,499 A | * | 9/1934 | Luce | .......... 70/458 |
| 4,280,258 A | * | 7/1981 | Kunze | .......... 24/566 |
| 4,503,591 A | * | 3/1985 | Adamska-Koperska | .... 24/708.6 |
| 4,958,791 A | * | 9/1990 | Nakamura | .......... 248/74.1 |
| 5,079,802 A | * | 1/1992 | Blase et al. | .......... 24/16 R |
| 5,655,329 A | * | 8/1997 | Yong-Set | .......... 43/44.92 |
| 2005/0028327 A1 | * | 2/2005 | Logan | .......... 24/16 PB |
| 2005/0115028 A1 | * | 6/2005 | Cheung | .......... 24/16 PB |

\* cited by examiner

*Primary Examiner*—Ramon O Ramirez
(74) *Attorney, Agent, or Firm*—Ronald M. Anderson

(57) ABSTRACT

A hanger is formed as an open loop of an elastomeric material. The open loop includes an integral eyelet formed at one end and an integral latch formed at the opposite end. The latch is inserted through an orifice defined by the eyelet and is held in place by an interference fit. Before engaging the latch with the orifice, a user passes one end of the hanger around portions of two or more objects, so that when the latch is engaged with the eyelet, the objects are connected by the hanger. The hanger, which can be made either of a clear or translucent colorless plastic, or of a colored plastic or other elastomeric material, can be used for hanging one or more objects from another object, or for simply connecting two or more objects together. It's low cost and ease of use make the hanger ideal for such applications.

Figure 1A:
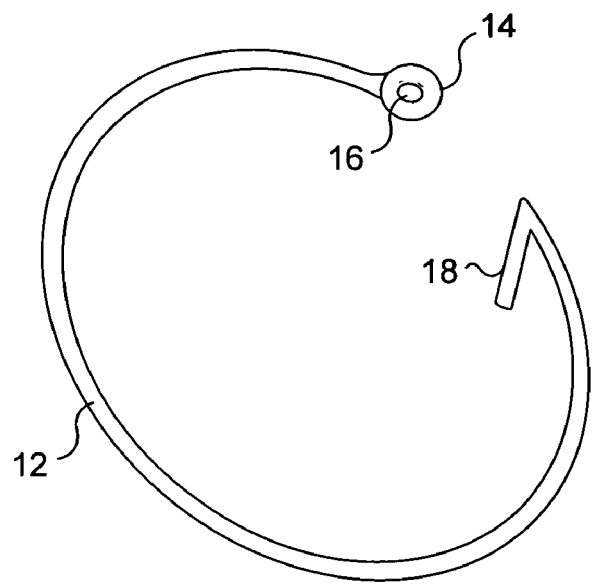

22 Claims, 2 Drawing Sheets

HANGER FOR CHRISTMAS ORNAMENTS AND OTHER OBJECTS

RELATED APPLICATIONS

This application is based on a now abandoned provisional application, Ser. No. 60/684,788, filed on May 26, 2005, the benefit of the filing date of which is hereby claimed under 35 U.S.C. § 119(e).

BACKGROUND

Christmas tree ornaments are typically provided with a string, a ribbon, or a metal hanger that connects to a loop on the ornament. The string or ribbon is tied to a branch of a Christmas tree, while the metal hanger is hung from a branch. Strings and ribbons may be colorful to add décor to the Christmas tree, but are time consuming to tie when affixing the ornament to a branch. They must then be untied when removing ornaments from a Christmas tree is being undecorated after the holidays.

Metal hangers are easier to attach to a branch, but they tend to easily become uncoupled from an ornament and frequently become unhooked from the branch of a Christmas tree if the ornament that is suspended from the metal hanger is inadvertently bumped. In addition, metal hangers are very visible and are a dull gray color so that they do little to improve the aesthetic appearance of the ornamentation on a tree.

It would therefore be desirable to employ a hanger that easily attaches to a tree branch or other supporting element, is clear so as to be unobtrusive, and remains attached to an object that it is supporting even when the object is moved about. None of the conventional hangers available for supporting ornaments or other objects from a tree branch or other support have all of these characteristics.

SUMMARY

Accordingly, an exemplary hanger has been developed for removably connecting a first object to a second object. For example, the first object might be a Christmas tree ornament and the second object might be a branch of a Christmas tree, a wreath, or a package. The exemplary hanger comprises a relatively thin elastomeric material that is formed into an open loop having a first end and a second end. A latch is integrally formed of a portion of the elastomeric material and is disposed at the first end of the open loop. The latch defines a substantial angle relative to a remainder of the elastomeric material comprising the open loop. An eyelet is also integrally formed of the elastomeric material, but is disposed at the second end of the open loop. The size of the opening in the eyelet is selected to engage the latch when the hanger is in use. The hanger thus connects the first object with the second object, but the latch can readily be disengaged from the eyelet when desired for removal of either object.

In one embodiment, the elastomeric material is translucent and colorless. In another embodiment, the elastomeric material is colored, e.g., to provide an ornamental or decorative function, or to more closely blend with a background color. Thus, the elastomeric material might be colored a dark green to blend with and more closely match the color of dark green needles on a Christmas tree.

In one embodiment, the loop defines a plane and the latch is formed at a substantial angle relative to the plane defined by the loop, e.g., at a right angle to the plane of the loop.

The elastomeric material preferably comprises a plastic that is molded in the shape of the open loop, with the latch and eyelet integrally formed from the plastic with the loop.

Another aspect is directed to a method for removably connecting a first object to a second object. The steps of the method are generally consistent with the functionality of the components of the hanger described above.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Figure 1B:
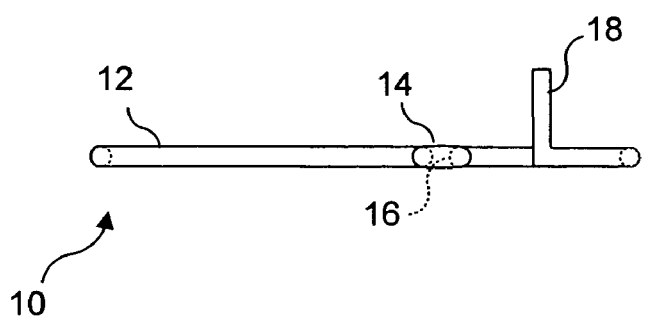
Figure 2:
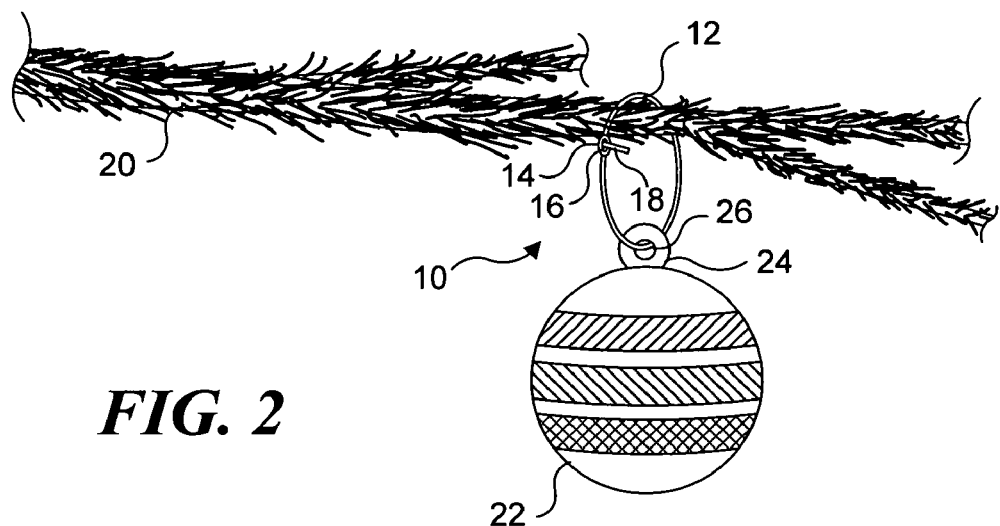
Figure 3:
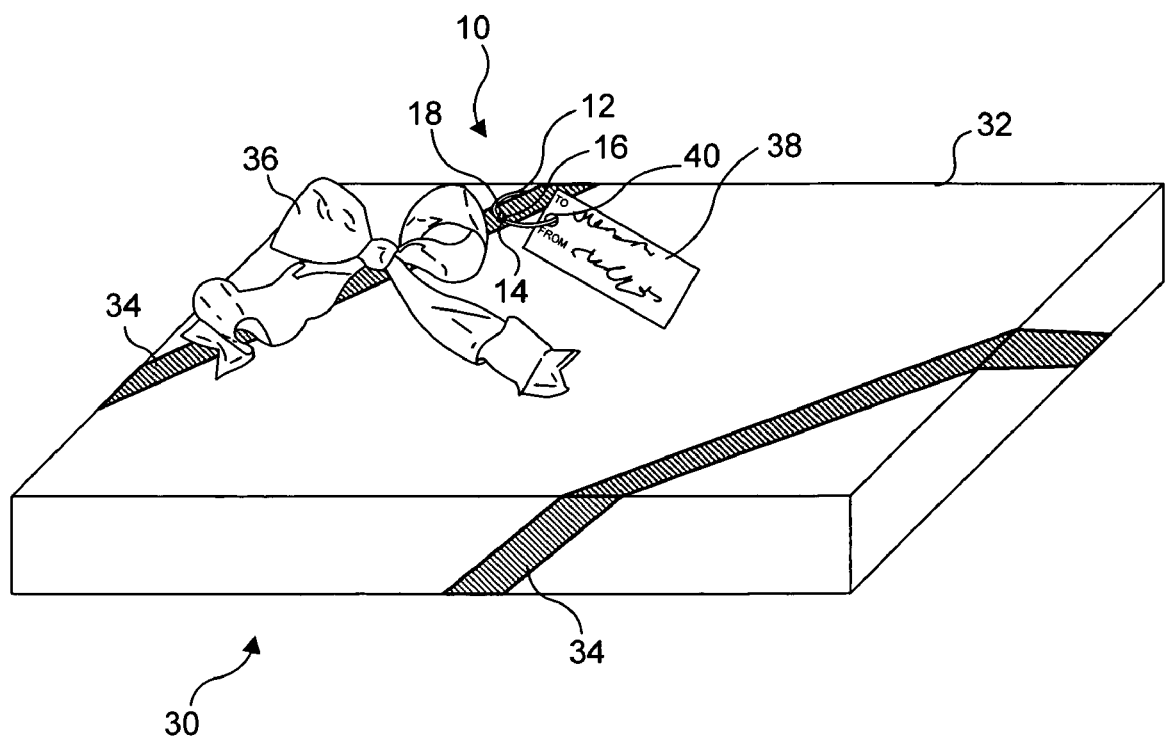

Various aspects and attendant advantages of one or more exemplary embodiments and modifications thereto will become more readily appreciated as the same becomes better understood by reference to the following detailed description, when taken in conjunction with the accompanying drawings, wherein:

FIGS. 1A and 1B respectively show an isometric view, and a top view of an embodiment of the hanger disclosed in further detail below;

FIG. 2 illustrates how the hanger shown in FIGS. 1A and 1B can be used to connect a Christmas tree ornament to a limb of a Christmas tree (only partially shown); and FIG. 3 is an isometric view of a package, showing how the hanger illustrated in FIGS. 1A and 1B can be used to connect a paper tag to a ribbon on the package.

DESCRIPTION

Figures and Disclosed Embodiments Are Not Limiting

Exemplary embodiments are illustrated in referenced Figures of the drawings. It is intended that the embodiments and Figures disclosed herein are to be considered illustrative rather than restrictive.

FIGS. 1A and 1B illustrate a hanger 10 that is usable for connecting two or more objects and which can readily be uncoupled when it is desired to remove one of the objects, or to remove the hanger from all of the objects. Hanger 10 is relatively simple, comprising a loop 12 that is formed of an elastomeric material. In one preferred embodiment, the elastomeric material is injection molded from a polycarbonate plastic, although other suitable elastomeric materials, such as other types of plastic, might alternatively be used. Polycarbonate plastic has several advantages, since it is one of the hardest and clearest plastic elastomeric materials readily available at low cost, and is relatively easy to form into the required shape, using an injection mold or other appropriate molding process.

Loop 12 is shown as being generally circular in FIG. 1A; however, it will be understood that the loop could be formed in a more oblong or elliptical shape, or as a teardrop shape, or in other suitable shapes, as appropriate for specific applications of the hanger. When not being used to connect two or more objects, the ends of loop 12 are disengaged from each other, generally as shown, for example, in FIG. 1A. One end of loop 12 includes an integrally molded eyelet 14 that defines an orifice 16. The opposite end of loop 12 includes a latch (or hook) 18. The size of orifice 16 is only slightly larger than that of latch 18, so that when latch 18 is inserted through orifice 16, friction between the outer surface of the latch and the inner surface of orifice 16 provides an interference fit that prevents the latch from disengaging the orifice until a user applies a force appropriate to do so. As a further alternative, it is contemplated that a portion of latch 18 can be slightly larger in size than the remainder thereof, so that once inserted through orifice 16, the latch snaps into place in engagement with the eyelet. This configuration would enable hanger 10 to provide a stronger holding power for connecting heavier objects.

To use hanger 10 to connect two or more objects, a user passes either end of loop 12 around a portion of each object to be connected and then engages latch 18 with orifice 16 of eyelet 14. The process of engaging the latch with the orifice can readily be accomplished with the fingers on one hand. Similarly, latch 18 can readily be disengaged from eyelet 14 by appropriately applying force against loop 12 adjacent eyelet 14 and the end of latch 18. As shown clearly in FIG. 1B, in the illustrated embodiment of hanger 10, latch 18 extends outwardly from a plane defined by loop 12 at a substantial angle, e.g., about 90°. However, it is contemplated that the latch can be angled either more or less than 90° and can also be angled radially inwardly or outwardly relative to loop 12. In this case, eyelet 14 would then be rotated (when molded or otherwise formed) as required to enable latch 12 to be readily inserted through orifice 16 within the eyelet.

FIG. 2 illustrates an exemplary application of hanger 10, showing how it can be used for connecting a Christmas ornament 22 (by utilizing an orifice 26 provided on a protrusion 24 of the Christmas ornament 22) to a branch 20 of a Christmas tree (not shown). In this application, the clear (or translucent) colorless appearance of the elastomeric material from which loop 12, eyelet 14, and latch 18 can be formed is likely to be preferable, since the hanger will then be less visible. The user should see Christmas ornament 22 suspended from branch 20, but hanger 10 should not be readily evident.

Alternatively, hanger 10 can be made of a colored elastomeric material that provides additional ornamentation. In certain applications, the use of a brightly colored elastomeric material for hanger 10 may be desirable for the decorative functionality provided thereby, or to more closely blend with or match a background color so that the hanger is not readily visible.

FIG. 3 illustrates another application of hanger 10 on a package 30 that includes a box 32 wrapped with a ribbon 34 and decorated with a bow 36. In this application, hanger 10 is employed for connecting a gift card 38 to ribbon 34. This application of hanger 10 provides one example in which the use of colored elastomeric material for the hanger may be more desirable than clear or colorless translucent elastomeric material. The ease with which hanger 10 can be passed through an orifice 40 in gift card 38 and around ribbon 34 before engaging latch 18 with eyelet 14 makes it ideal for use by people who are wrapping a number of packages and prefer not to use adhesive to attach the gift card to the package.

Many other applications of hanger 10 are contemplated. Since the hanger can be made in different sizes, it can be used for connecting a variety of different objects. For example, a user may wish to prevent several related objects from being separated from one another and can then use hanger 10 to connect the objects. Since it is easy to disengage latch 18 from orifice 16, any of the objects can be easily removed from the hanger.

Hanger 10 can be used to hang one or more objects from another object, as is shown in FIG. 2. Alternatively, the hanger can be used to simply connect the objects together, as shown in FIG. 3.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A hanger for removably connecting a plurality of objects, comprising:
    (a) a loop fabricated of an elastomeric material and having opposite first and second ends; and
    (b) a selectively engageable connection between the first and second ends of the loop to enable the loop to be selectively closed by engaging the first end with the second end to connect the plurality of objects such that the plurality of objects can move unimpeded around the loop between the first end of the loop and the second end of the loop, and to be selectively opened by disengaging the first end from the second end to remove an object from the loop, wherein the selectively engageable connection comprises an eye formed on the first end of the loop and a latch formed proximate to the second end of the loop, wherein the latch comprises a short segment of the loop that forms a substantial angle relative to a remainder of the second end.

2. The hanger of claim 1, wherein the eye engages the latch to close the selectively engageable connection and the latch is removed from the eye to open the selectively engageable connection.

3. A hanger for removably connecting a first object to a second object, comprising:
    (a) a relatively thin elastomeric material formed into an open loop having a first end and a second end;
    (b) a latch integrally formed of a portion of the elastomeric material and disposed at the first end of the open loop that defines a substantial angle relative to a remainder of the elastomeric material comprising the open loop; and
    (c) an eyelet integrally formed at the second end of the open loop, the eyelet having an internal diameter that is sized to removably engage the latch after the loop has been disposed so as to couple with the first object and the second object, thereby removably connecting the first object with the second object such that the first object and the second object can move unimpeded along the loop, between the first end of the loop and the second end of the loop.

4. The hanger of claim 3, wherein the elastomeric material is translucent and colorless.

5. The hanger of claim 3, wherein the elastomeric material is colored.

6. The hanger of claim 3, wherein the loop defines a plane and the latch is formed at the substantial angle relative to the plane defined by the loop.

7. The hanger of claim 3, wherein the elastomeric material comprises a plastic that is molded in the shape of the open loop, with the latch and eyelet integrally formed with the plastic.

8. A method for removably connecting a first object to a second object, comprising the steps of:

(a) passing a loop of an elastomeric material around at least a portion of each of the first object and the second object; and (b) then engaging a latch formed on one end of the loop of the elastomeric material with an eyelet formed on the other end of the elastomeric material wherein the latch comprises a short segment of the loop that forms a substantial angle relative to a remainder of the other end of the loop, an internal diameter of the eyelet being sized so that the latch only engages the eyelet and in an interference fit, and so that friction tends to prevent the latch from disengaging the eyelet unless a user applies a force to disengage the latch from the eyelet.

9. The method of claim 8, wherein the step of passing the loop comprises the step of threading the loop of elastomeric material through an orifice on at least one of the first object and the second object.

10. A hanger configured to removably hang a first object from a second object, comprising:

(a) a flexible loop that is selectively configurable as one of an open loop and a closed loop and which is formed of a molded elastomeric material, wherein the flexible loop has to be opened in order to engage the first object or the second object, and wherein the flexible loop has to be closed to enable the first object or the second object that is engaged to depend from and be supported by the other of the first object or the second object that is not engaged; and (b) means for removably engaging one end of the flexible loop with an opposite end of the flexible loop, in an interference fit, so that friction generally prevents the one end of the flexible loop from disengaging the opposite end of the loop.

11. The hanger of claim 10, wherein the means for removably engaging comprises an integral eyelet that is formed of the molded elastomeric material at the one end of the flexible loop.

12. The hanger of claim 11, wherein the means for removably engaging comprises an integral latch that is formed at the other end of the flexible loop.

13. The hanger of claim 12, wherein the integral eyelet has an internal size that is only slightly greater than a size of the latch, to produce the interference fit.

14. The hanger of claim 12, wherein the flexible loop defines a plane and wherein the latch extends outwardly of the plane, forming a substantial angle with the plane.

15. The hanger of claim 10, wherein the elastomeric material is generally translucent to visible light.

16. The hanger of claim 10, wherein the elastomeric material is colored to provide an ornamentation function.

17. The hanger of claim 10, wherein the elastomeric material is a plastic.

18. A Christmas ornament hanger that is configured to couple an ornament to an object, comprising:

(a) a selectively closable flexible loop formed of an elastomeric material and adapted when closed, to engage a Christmas tree ornament and couple the Christmas tree ornament to an object;

(b) a hook formed on one end of the selectively closable flexible loop; and (c) an eye formed on another end of the selectively closable flexible loop, to receive the hook to close the selectively closable flexible loop, the hook being held only within the eye.

19. The Christmas ornament hanger of claim 18, wherein the eye is sized so as to provide an interference fit with the hook.

20. The Christmas ornament hanger of claim 18, wherein the elastomeric material is generally translucent and colorless.

21. The Christmas ornament hanger of claim 18, wherein the hook, the eye, and the selectively closable flexible loop are integrally molded from the elastomeric material.

22. The Christmas ornament hanger of claim 18, wherein the elastomeric material is a plastic.

* * * * *